(12) United States Patent
Tsurumi et al.

(10) Patent No.: US 9,201,611 B2
(45) Date of Patent: Dec. 1, 2015

(54) INTERFACE CONTROL APPARATUS, DATA STORAGE APPARATUS AND INTERFACE CONTROL METHOD

(71) Applicant: Kabushiki Kaisha Toshiba, Minato-ku (JP)

(72) Inventors: Hiroshi Tsurumi, Kawasaki (JP); Hidetoshi Koike, Kodaira (JP); Nobuaki Yoshitake, Kawasaki (JP); Tomoo Utsumi, Chigasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 252 days.

(21) Appl. No.: 14/022,431

(22) Filed: Sep. 10, 2013

(65) Prior Publication Data

US 2014/0317362 A1 Oct. 23, 2014

(30) Foreign Application Priority Data

Apr. 19, 2013 (JP) ................................. 2013-088435

(51) Int. Cl.
*G06F 3/06* (2006.01)

(52) U.S. Cl.
CPC ............ *G06F 3/0659* (2013.01); *G06F 3/0604* (2013.01); *G06F 3/0673* (2013.01)

(58) Field of Classification Search
None
See application file for complete search history.

(56) References Cited

U.S. PATENT DOCUMENTS

| 2005/0251656 A1 | 11/2005 | Seki |
| 2007/0195767 A1 | 8/2007 | Yonemoto et al. |

FOREIGN PATENT DOCUMENTS

| JP | 2004-94533 | 3/2004 |
| JP | 2006-238039 | 9/2006 |
| JP | 2006-273261 | 10/2006 |
| JP | 2007-228227 | 9/2007 |

*Primary Examiner* — Kevin Verbrugge
(74) *Attorney, Agent, or Firm* — Oblon, McClelland, Maier & Neustadt, L.L.P.

(57) ABSTRACT

According to one embodiment, an interface control apparatus includes an interface, a table, a command processor, and a controller. The interface transmits and receives information to and from a host. The table holds management information for managing an address in a memory space in the host. The command processor carries out a command process of accessing the memory space in the host using the management information. The controller releases the management information corresponding to the command process from the table in response to completion of the command process.

18 Claims, 11 Drawing Sheets

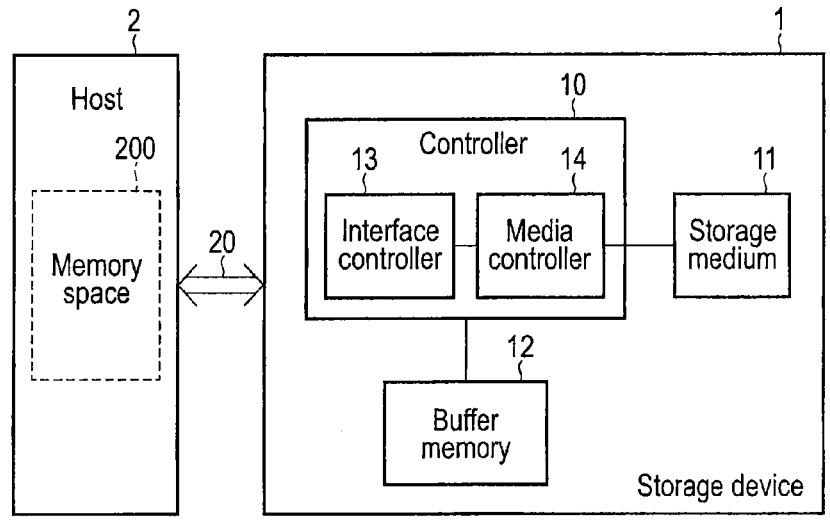
F I G. 1
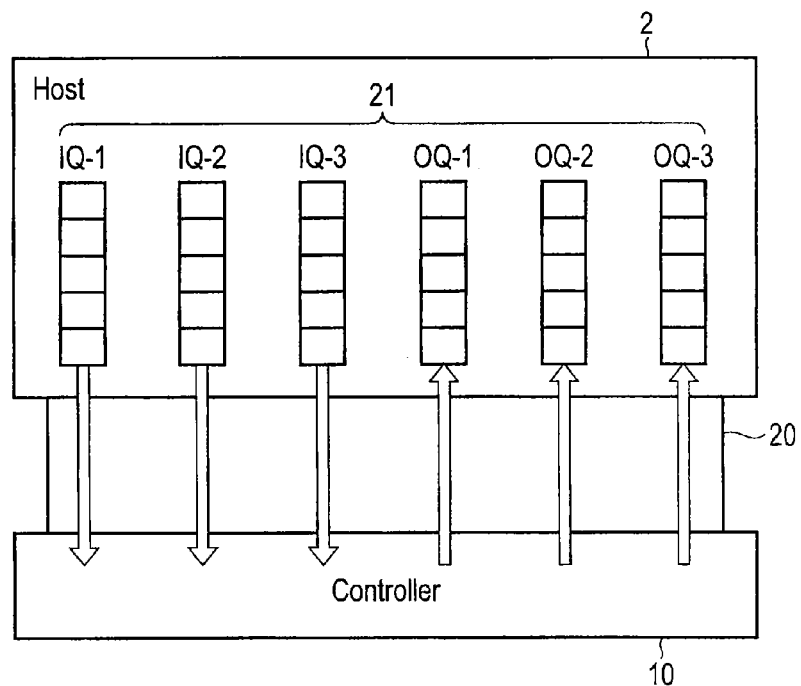
F I G. 2

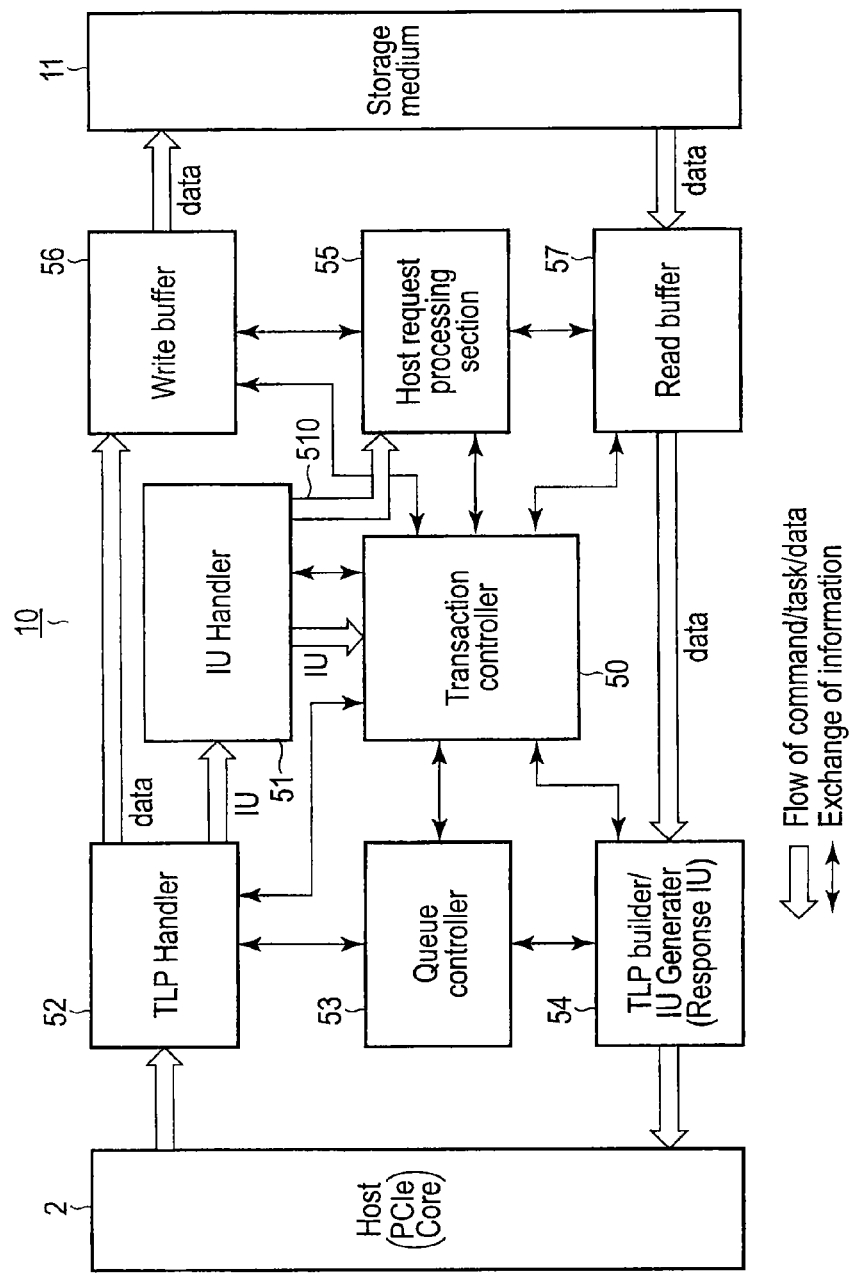
F I G. 5

| Byte/Bit | 7 | 6 | 5 | 4 | 3 | 2 | 1 | 0 |
|---|---|---|---|---|---|---|---|---|
| 0 | colspan="8" | IU TYPE=11h ||||||||
| 1 | | | | | | | | |
| 2 | colspan="8" | IU LENGTH=(n-3)h ||||||||
| 3 | | | | | | | | |
| 4 | colspan="8" | RESPONSE OQ ID ||||||||
| 5 | | | | | | | | |
| ... | ⋮ |||||||||
| 12 | colspan="8" | DATA BUFFER SIZE ||||||||
| ... | | | | | | | | |
| 15 | | | | | | | | |
| ... | ⋮ |||||||||
| 27 | colspan="8" | Reserved ||||||||
| ⋮ | | | | | | | | |
| ⋮ | ⋮ |||||||||
| 32 | colspan="8" | CDB ||||||||
| ... | | | | | | | | |
| 47 | | | | | | | | |
| 48 | colspan="8" | ADDITIONAL CDB BYTES ||||||||
| ... | | | | | | | | |
| 63 | | | | | | | | |
| 64 | colspan="8" | SGL DESCRIPTOR ||||||||
| ... | | | | | | | | |

| Byte/Bit | 7 | 6 | 5 | 4 | 3 | 2 | 1 | 0 |
|---|---|---|---|---|---|---|---|---|
| 0 | | colspan="7" | ADDRESS (Address in memory space) |||||| (LSB) |
| ... | | | | | | | | |
| 7 | (MSB) | | | | | | | |
| 8 | | colspan="7" | LENGTH (Access data length of address) |||||| (LSB) |
| ... | | | | | | | | |
| 11 | (MSB) | | | | | | | |
| 12 | | | | | | | | (LSB) |
| ... | | | | | | | | |
| 14 | (MSB) | | | | | | | |
| 15 | | | | | | | | |

FIG. 7

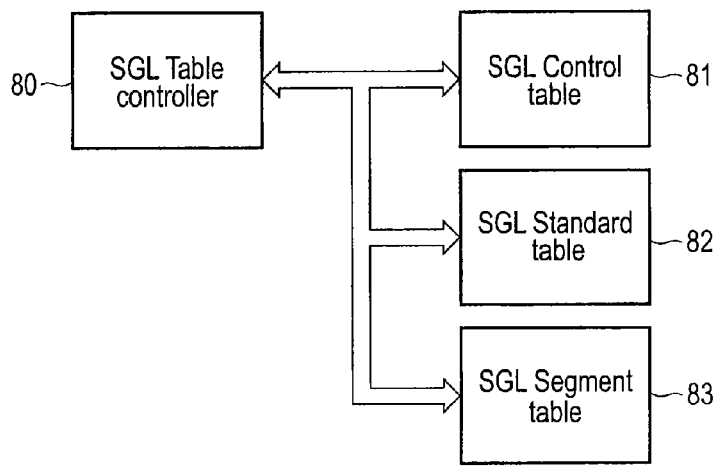
F I G. 8
| Byte/Bit | 7 | 6 | 5 | 4 | 3 | 2 | 1 | 0 |
|---|---|---|---|---|---|---|---|---|
| 0 | | | | | | END | PRI | VLD |
| 1 | Reserved ||||||||
| 2 | NEXT TABLE NUMBER ||||||||
| 3 | Reserved ||||||||
| 4 | REMAINING SGL TABLE OFFSET | | | | | | | (LSB) |
| 5 | (MSB) |||||||| 
| 6 | STANDARD SGL TABLE OFFSET | | | | | | | (LSB) |
| 7 | (MSB) ||||||||
| 8 | | | | | | | | (LSB) |
| 9 | SGL ADDRESS OFFSET ||||||||
| 10 | ||||||||
| 11 | (MSB) ||||||||
| 12 | | | | | | | | (LSB) |
| 13 | DATA TRANSFER BYTES ||||||||
| 14 | ||||||||
| 15 | (MSB) ||||||||
F I G. 9

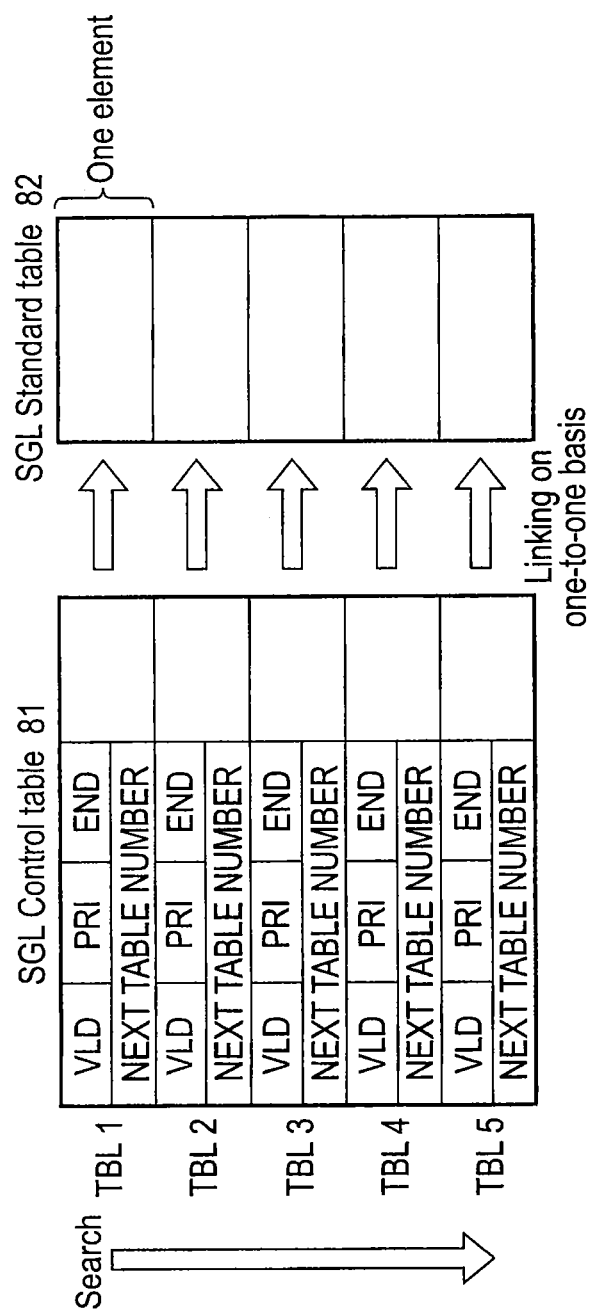
F I G. 10

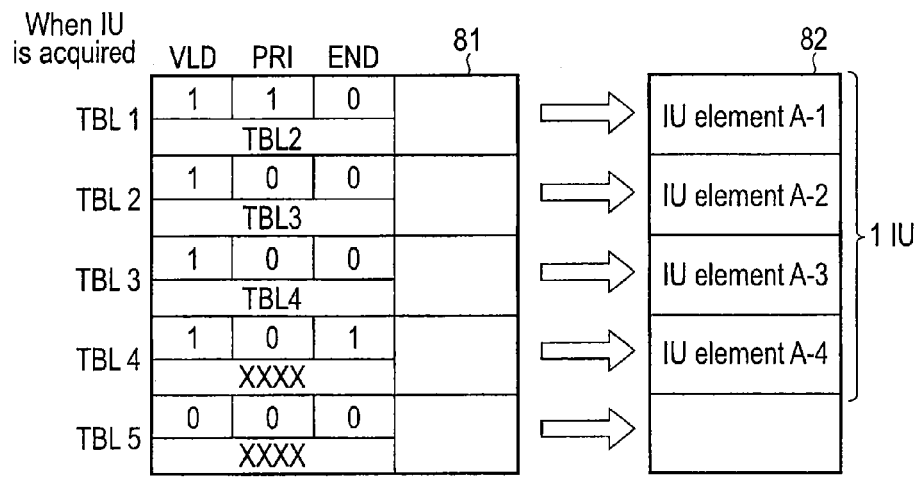
F I G. 11
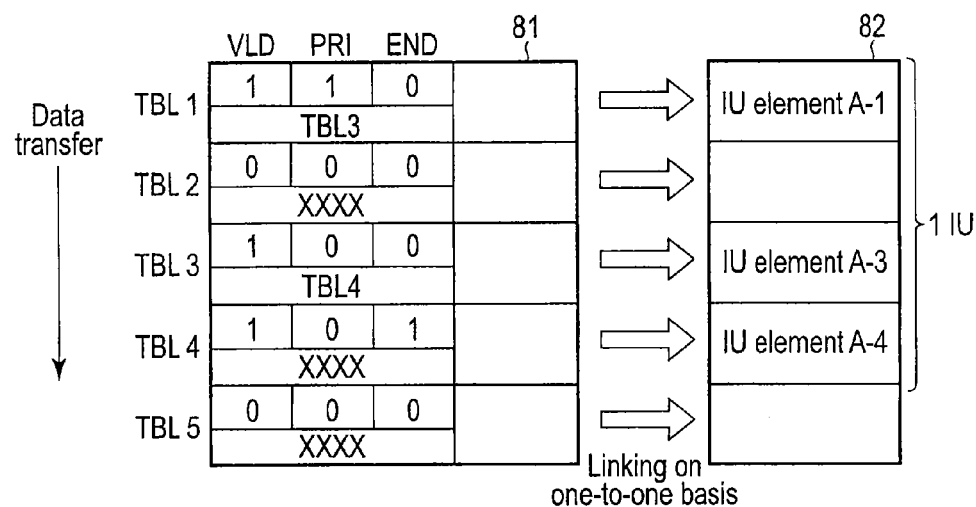
F I G. 12

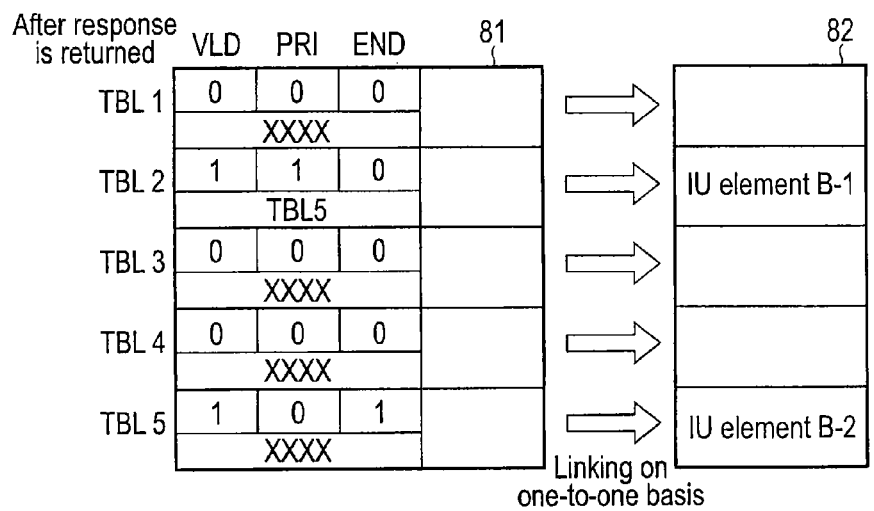
F I G. 14

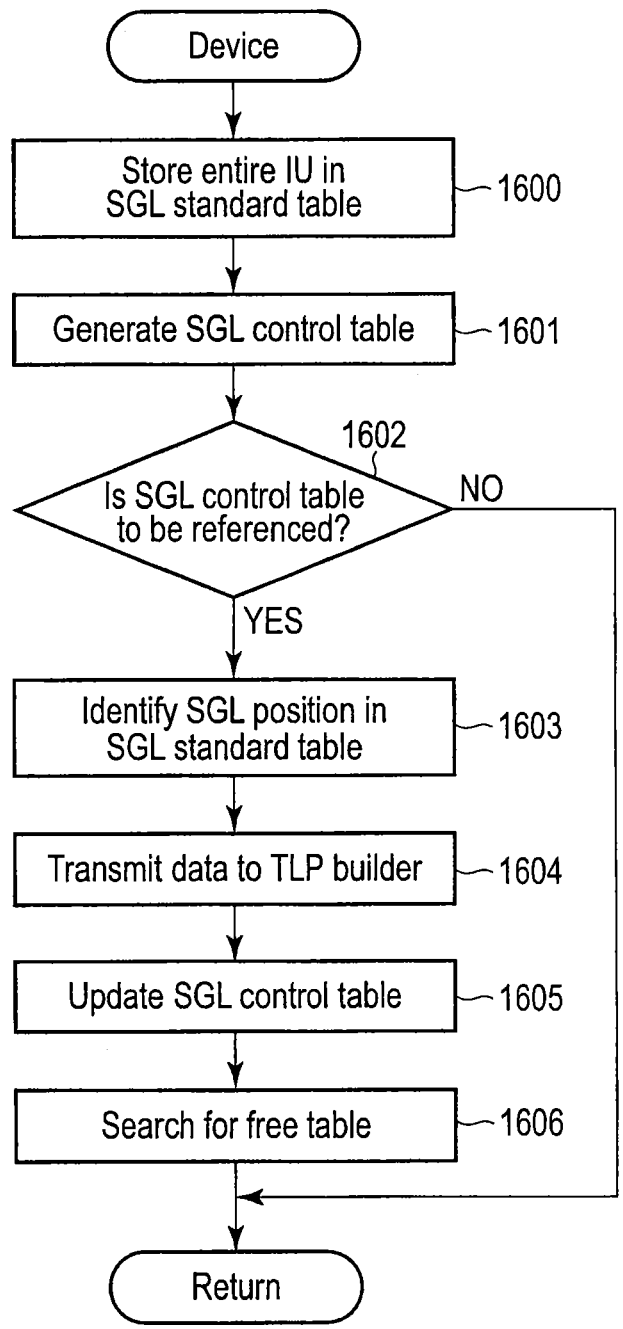
F I G. 16

INTERFACE CONTROL APPARATUS, DATA STORAGE APPARATUS AND INTERFACE CONTROL METHOD

CROSS-REFERENCE TO RELATED APPLICATIONS

This application is based upon and claims the benefit of priority from Japanese Patent Application No. 2013-088435, filed Apr. 19, 2013, the entire contents of which are incorporated herein by reference.

FIELD

Embodiments described herein relate generally to an interface control apparatus, a data storage apparatus, and an interface control method.

BACKGROUND

For an interface between a host and a data storage device, for example, standards have been proposed which are referred to as SCSI over PCI Express (SOP) and which comprise PCI Express (registered trade mark; hereinafter referred to as PCIe) standards to which SCSI standard are mapped.

Such interface standards are characterized in that a host side can comprise a plurality of queues arranged therein and which allows queuing of request information for requesting processing of commands, tasks, and the like and response information on responses from the storage device. Moreover, interface control specifications have been established which allow the storage device side to control the plurality of queues.

The request information and response information stored in the plurality of queues are sometimes referred to as information units (IUs). The request information and response information are sometimes referred to as request IUs and response IUs, respectively. The information units may be stored in one element or separately in a plurality of elements. The element is the unit of storage for the storage of an information unit in a queue.

The host side, for example, stores a command in a request IU and issues the request IU to the storage device side. The storage device side extracts the request IU and carries out a command process. The information unit can store not only a command and a task but also a list of addresses (Scatter Gather List [SGL]) in a memory space secured on the host side. By acquiring an SGL from the information unit, the storage device side can access an address in the memory space on the host side which is specified by the SGL. Thus, the storage device side can acquire data distributed in the memory space on the host side or transfer data to the memory space.

The storage device side holds, in a table, all information contained in the information unit issued by the host side until the storage device side returns a response. The information may include an SGL, and thus, the table needs to have a large capacity. Thus, desirably, table management is achieved so that the table can be efficiently used, allowing the capacity of the table to be reduced to the minimum necessary.

BRIEF DESCRIPTION OF THE DRAWINGS

FIG. 1 is a block diagram for explaining a system configuration according to an embodiment;
FIG. 2 is a conceptual diagram for explaining an interface configuration according to the embodiment;
FIG. 5 is a diagram for explaining a configuration of a controller in a storage device according to the embodiment;
FIG. 6 is a diagram for explaining an example of a format of the information unit according to the embodiment;
FIG. 7 is a diagram for explaining an example of a format of an SGL according to the embodiment;
FIG. 8 is a block diagram for explaining an SGL table according to the embodiment;
FIG. 9 is a diagram for explaining an example of an SGL control table according to the embodiment;
FIG. 10 is a diagram for explaining relationships between the SGL control table and an SGL standard table according to the embodiment;
FIG. 11 is a diagram for explaining operation of an SGL table controller according to the embodiment;
FIG. 12 is a diagram for explaining operation of the SGL table controller according to the embodiment;
FIG. 14 is a diagram for explaining operation of the SGL table controller according to the embodiment;
FIG. 16 is a flowchart for explaining operation of a controller in the storage device according to the embodiment.

DETAILED DESCRIPTION

Figure 3A:
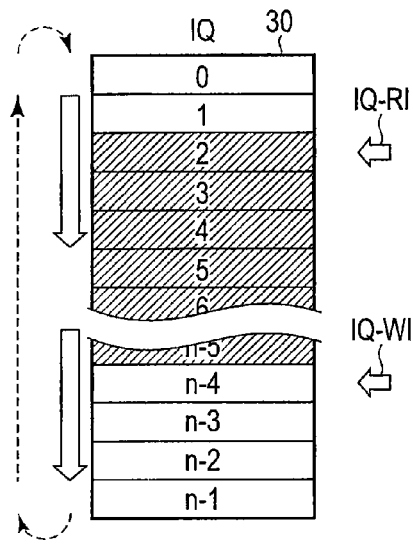
FIGS. 3A and 3B are diagrams for explaining a configuration of a queue according to the embodiment.

In general, according to one embodiment, an interface control apparatus includes an interface, a table, a command processor, and a controller. The interface transmits and receives information to and from a host. The table holds management information for managing an address in a memory space in the host. The command processor carries out a command process of accessing the memory space in the host using the management information. The controller releases the management information corresponding to the command process from the table in response to completion of the command process.

Various embodiments will be described hereinafter with reference to the accompanying drawings.
[System Configuration]
FIG. 1 is a block diagram for explaining a system configuration according to the present embodiment. As shown in FIG. 1, a storage device (data storage apparatus) 1 and a host 2 are connected together by an interface bus 20 complying with, for example, PCIe standards, according to the present embodiment. The storage device 1 is, for example, a hard disk drive (HDD), a solid-state drive (SSD), or a hybrid HDD. The HDD comprises a disk as a storage medium 11. The SSD comprises a flash memory as the storage medium 11. The hybrid HDD comprises a disk and a flash memory as the storage medium 11.

The storage device roughly comprises a controller 10, a storage medium 11, and a buffer memory 12. The controller 10 includes an interface controller 13 and a media controller 14. According to the present embodiment, the interface controller 13 is connected to the host 2 via the interface bus 20 to control transfer of information units (IUs), specifically request information (request IUs) and response information (response IUs).

The media controller 14 is a read/write controller that cooperates with the interface controller 13 in controlling a data read process and a data write process carried out on the storage medium 11. The buffer memory 12 stores information under the control of the controller 10.

According to the present embodiment, the storage device 1 can access a memory space 200 provided in the host 2, via the interface controller 13 and the interface bus 20. Specifically, as described below, the interface controller 13 uses a Scatter Gather List (SGL) to acquire data distributed in the memory space 200 of the host 2 or to transfer data to the memory space 200. The SGL is a list of addresses in the memory space 200 and is stored in an information unit such as a request IU, which is then provided to the storage device. That is, the storage device 1 uses the SGL to recognize the memory space 200 in the host 2.

FIG. 2 is a conceptual diagram illustrating a configuration of an interface between the storage device 1 and the host 2 according to the present embodiment. As shown in FIG. 2, the host 2 involves interface specifications according to which the host 2 comprises a queue set 21 including a plurality of queues. The queue set 21 includes a plurality of queues (inbound queues [IQs]) IQ-1 to IQ-3 in which request information (request IUs) for commands and tasks is queued so as to be issued to the storage device 1. The queue set 21 also includes a plurality of queues (outbound queues [OQs]) OQ-1 to OQ-3 in which response information (response IUs) transmitted by the storage device 1 are temporarily queued.

Figure 3B:
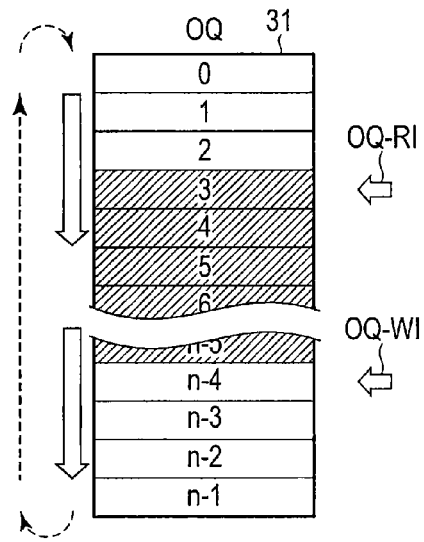

The controller 10 of the storage device 1 extracts request information (request IU) from any of queues IQ-1 to IQ-3 in the host 2 via the interface bus 20. Furthermore, in returning a response, the controller 10 stores response information (response IU) in any of queues OQ1 to OQ-3 in the host 2 via the interface bus 20. FIG. 3A shows a queue (IQ) 30 in which request information (request IUs) is stored. Furthermore, FIG. 3B shows a queue (OQ) 31 in which response information (response IU) is stored. In FIGS. 3A and 3B, a shaded part shows effective elements in which an IU is stored. The element is the unit of storage for the storage of an information unit (IU) in a queue.

As shown in FIGS. 3A and 3B, queues 30 and 31 store an information unit (IU) in units of elements (0 to n−1). The storage (addition) of an information unit in queues 30 and 31 and the extraction of an information unit from queues 30 and 31 are controlled by two pointers, a write pointer (Write Index [WI]) and a read pointer (Read Index [RI]).

As shown in FIG. 3A, in issuing request information (request IU) such as a command or a task, the host 2 stores the request IU in elements in queue (IQ) 30 indicated by the write pointer IQ-WI. The host 2 advances the write pointer IQ-WI by an amount equivalent to the number of elements in which request IU has been stored. On the other hand, the controller 10 of the storage device 1 extracts the request IU from elements in queue (IQ) 30 indicated by the read pointer IQ-RI. The controller 10 advances the read pointer IQ-RI by an amount equivalent to the number of elements from which the request IU has been extracted.

Furthermore, in returning response information (response IU), the controller 10 of the storage device stores the response IU in elements in queue (OQ) 31 indicated by the write pointer OQ-WI. The controller 10 advances the write pointer OQ-WI by an amount equivalent to the number of elements in which the response IU has been stored. On the other hand, the host 2 extracts the response IU from elements in queue (OQ) 31 indicated by the read pointer OQ-RI. The host 2 advances the read pointer OQ-RI by an amount equivalent to the number of elements from which the response IU has been extracted.

Figure 4A:
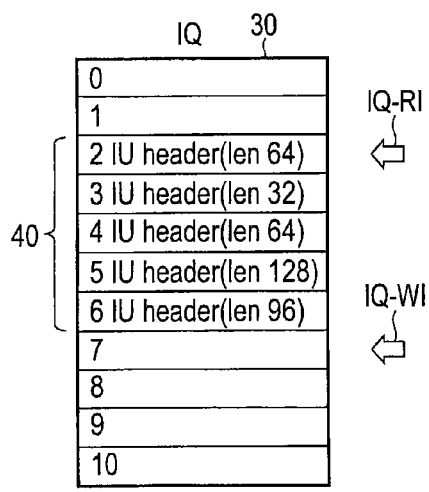
FIGS. 4A and 4B are diagrams for explaining storage specifications for an information unit according to the embodiment.
Figure 4B:
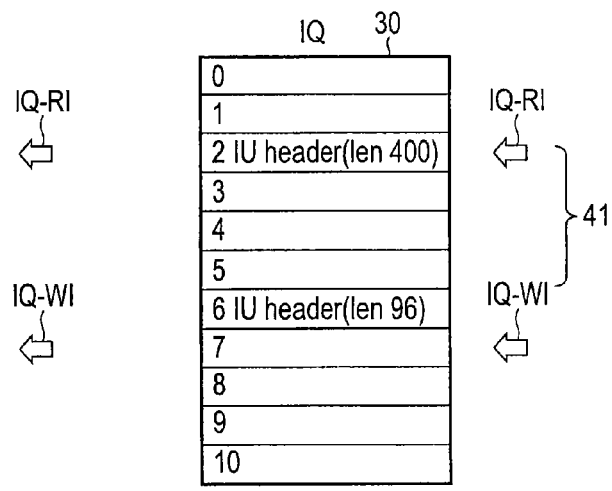

FIGS. 4A and 4B are diagrams illustrating storage specifications for request IUs stored in queue (IQ) 30. FIG. 4A is a diagram showing specifications according to which one request IU 40 is stored in each element in queue (IQ) 30. In contrast, FIG. 4B is a diagram showing specifications according to which one request IU 40 is stored in a plurality of elements 41 (in this case, four elements). In short, as shown in FIG. 4B, the IU stored in a plurality of elements in a divided manner is referred to as a spanning IU across multiple elements. On the other hand, as shown in FIG. 4A, the IU stored in each element is referred to as an IU contained within a single element.

As described above, the controller 10 of the storage device 1 extracts the request IU from the elements in queue (IQ) 30 indicated by the read pointer IQ-RI. According to the present embodiment, the controller 10 checks the number of elements in which the request IU is stored. Furthermore, as shown in FIG. 4B, the controller 10 checks whether or not the request IU is a spanning IU across multiple elements stored in the IQ 30 so as to be divided into a plurality of elements. Specifically, the controller 10 can determine whether or not the request IU is a spanning IU across multiple elements by reading any number of elements including a head of request IU from the IQ 30 in accordance with the read pointer IQ-RI and comparing an element size with information set in an IU type section and an IU length in an IU header contained in the leading element.

Furthermore, in returning a response IU in response to the request IU extracted from the IQ 30, the controller 10 identifies the OQ 31 based on OQ-ID information set in a queuing interface specifications section in the IU header contained in the extracted request IU. The host 2 extracts a response IU from queue (OQ) 31.

The controller 10 checks the IU length in the IU header in the leading element in the extracted request IU. Upon determining that the request IU has been completely acquired, the controller 10 transmits the information in the request IU to a host request processing section 55. If the number of elements acquired is insufficient to complete the request IU, the request IU is precluded from being transmitted to the host request processing section 55 until all the elements needed to complete the request IU are acquired. In this state, the command process for the request IU stored in the IQ in the host 2 is stagnant. Thus, the controller 10 carries out a process of acquiring a rest of elements in the request IU in preference to acquisition of elements for the other IQs.

FIG. 5 is a block diagram showing an internal configuration (functions) of the controller 10 according to the present embodiment.

As shown in FIG. 5, the controller 10 comprises, as functions included in the interface controller 13, a transaction controller 50, an IU handler 51, a Transaction Layer Packet (TLP) handler 52, a queue controller 53, and a TLP builder/IU generator 54. The TLP builder/IU generator 54 is also referred to as the TLP builder 54.

Moreover, the controller 10 comprises a host request processing section 55 as a function included in the media controller 14. The controller 10 also comprises a write buffer 56 and a read buffer 57 as functions to use the buffer memory 12.

The transaction controller 50 includes an SGL table controller (SGL Table Controller) described below and requests the TLP builder 54 to issue a memory read TLP (that is, a read request) for acquiring a request IU from any of the IQs on the host 2. The IU handler 51 checks the IU header (IU type and IU length) of the request IU acquired from the IQ. The IU handler 51 determines whether the IU acquired from the host 2 is a spanning IU across multiple elements or an IU contained within a single elements.

The TLP handler 52 determines whether information from the host 2 is an IU or data. And the TLP handler 52 transfers the IU to the IU handler 51 if the information is an IU. Furthermore, the TLP handler 52 stores the data in the write buffer 56. The queue controller 53 manages the state of each queue IQ or OQ in the host 2 and accepts a notification indicative of the set queues from the host 2. In accordance with the notification, the queue controller 53 transmits a request to acquire elements (that is, an IU) to the transaction controller 50.

In response to the request from the transaction controller 50, the TLP builder 54 issues a memory read TLP for requesting transfer of the request IU to the host 2 via the interface bus 20. The TLP builder 54 also transmits a response IU to the host 2 to return a response after carrying out the request. The host request processing section 55 accepts command/task information 510 output by the IU handler 51 to carry out a command process or a task process. That is, for example, for a write command, the host request processing section 55 carries out a command process for writing data from the host 2 to the storage medium 11 via the write buffer 56. Furthermore, for example, for a read command, the host request processing section 55 carries out a command process for transmitting data read from the storage medium 11 to the host 2 via the read buffer 57.

FIG. 6 shows an example of the format 60 of a command IU that stores a command.

As shown in FIG. 6, in the command IU, an SGL area (SGL descriptor) starts from the 64th byte. An example of the format of an SGL will be described below with reference to FIG. 7. The command IU comprises the IU type, the IU length, and a response OQ ID in the header section. The IU type is indicative of the type of request information such as a command or a task from the host 2. The IU length is indicative of the data length of the IU. The response OQ-ID is indicative of ID information that identifies the OQ for return of a response IU.

Moreover, the command IU comprises a data buffer size, a CDB, and additional CDB bytes. The data buffer size is indicative of the buffer size of data specified in a command (read command or write command). The CDB is a command descriptor block that describes the contents of the command. The additional CDB bytes are indicative of a data length needed to describe the additional CDBs.

As described above, the SGL is a list indicative of addresses in the memory space 200 in the host 2. As shown in FIG. 6, the SGL is stored in a command IU, which is provided to the storage device 1. The storage device 1 can acquire data distributed in the memory space 200 or transfer data to the memory space 200, using the SGL.

FIG. 7 shows an example of the format 70 of the SGL. As shown in FIG. 7, the SGL comprises addresses in the memory space 200 and the access data length of each address. The access data length is indicative of the data length of data accessed via the address. Furthermore, an SGL can be set on the memory space 200 in the host 2 through a link from the SGL stored in a command IU. In this case, the storage device 1 reads the SGL set on the memory space 200 at any timing and transfers the data at any timing.

An SGL stored in an IU will be described below. A command IU can store up to 252 SGLs when, for example, a single SGL is defined by 16 bytes. In general, the element size of a queue is not always set to fit to the maximum IU size but an appropriate size is adopted which allows the elements to be efficiently used in the system. Thus, an IU that stores a large number of SGLs is divided into a plurality of elements, which are stored in a queue.

As shown in FIG. 8, the transaction controller 50 comprises an SGL table controller 80. The SGL table controller 80 manages three types of tables, an SGL control table 81, an SGL standard table 82, and an SGL segment table 83. The SGL segment table 83 will not be described in the present embodiment.

When the transaction controller 50 receives an IU, the SGL table controller 80 temporarily stores the entire IU in the SGL standard table 82. The table 82 is divided into elements each specified to have, for example, an element size of 256 bytes. Every read element is recorded in the table 82. The SGL control table 81 is generated simultaneously with recording of the IU in the SGL standard table 82 in units of elements. The SGL control table 81 is associated with each of the elements recorded in the SGL control table 81 (linking).

FIG. 9 shows an example of the SGL control table 81. As shown in FIG. 9, the SGL control table 81 comprises a primary bit (PRI). As described above, an IU with elements read from the host 2 (in this case, a command IU) is stored in the SGL standard table 82. In PRI, binary 1 is set in order to indicate that the SGL control table 81 is associated with the IU stored in the SGL standard table 82. The SGL control table 81 with binary 1 set in PRI is referred to as a primary table. Only one primary table (table 81) is generated for each IU.

Furthermore, binary 0 is set for PRI in an SGL control table 81 containing no IU header and in which the succeeding elements are recorded. The SGL control table 81 with binary 0 set in PRI is referred to as a secondary table. No secondary table may be generated for each IU (the IU can be fitted into one element) or one or more secondary tables may be generated for each IU (the IU spans a plurality of elements).

A table ID is assigned to the SGL control table 81, and a next table number indicating which table 81 stores the succeeding elements is defined for the SGL control table 81. An end bit is set for the SGL control table 81 for the last IU to allow the IU corresponding to the SGL control table 81 to be determined to be the final element. Moreover, the SGL control table 81 comprises a remaining SGL length, a standard SGL table offset, an SGL address offset, and a data transfer bytes set therein. The standard SGL table offset is indicative of how far the SGL has been processed. The remaining SGL length is indicative of the amount of SGL that has not been processed. The SGL address offset is indicative of an address for identifying the position of the SGL in the SGL standard table 82. The data transfer bytes are indicative of the length of data transferred in an SGL.

FIG. 10 shows relationships between the SGL control table 81 and the SGL standard table 82. In this case, when an IU is recorded in the SGL standard table 82 in units of elements, for example, five (TBL1 to TBL5) SGL control tables 81 are simultaneously generated. Tables TBL1 to TBL5 are associated (linked) with the respective elements recorded in the SGL standard table 82, with binary 1 set for a valid flag (VLD) corresponding to each of the recorded elements. (FIG. 10 is modified)

[Interface Control Operation]

Operation of the controller 10 according to the present embodiment will be described below with reference to FIG. 1 to FIG. 6.

Figure 15:
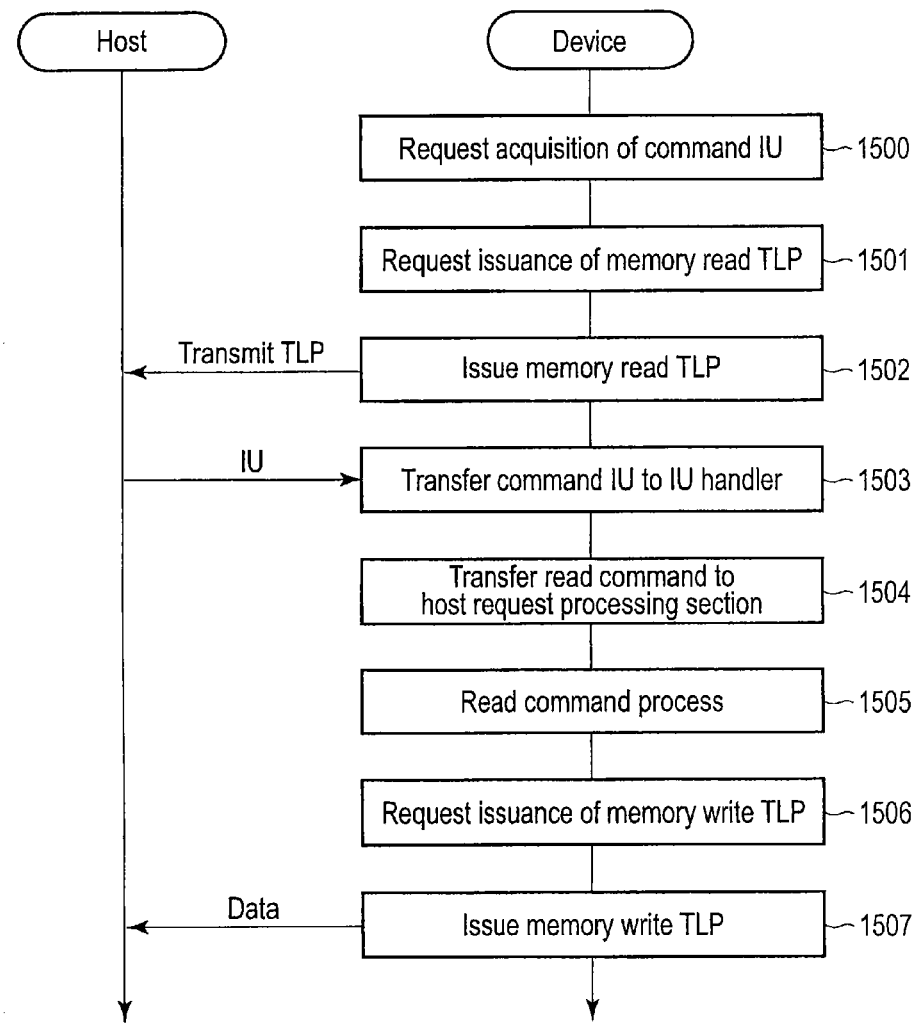
FIG. 15 is a timing chart for explaining operation of a system according to the embodiment.

First, a process in which the controller 10 acquires a command IU (containing a read command as described below) from the host 2 will be described with reference to FIG. 15.

In the controller 10, the queue controller 53 receives a notification indicative of set queues from the host 2 and then transmits a request to acquire elements (that is, a command IU) to the transaction controller (T-controller) 50 (block 1500). The T-controller 50 inquires about the free space status of the SGL standard table 82 via the SGL table controller 80.

The T-controller 50 calculates the number of elements to be actually acquired based on information indicative of the free space status, which is a response from the SGL table controller 80, and the number of elements requested by the queue controller 53. Based on the calculated number of elements, the T-controller 50 requests the TLP builder 54 to issue a memory read TLP (that is, a read request) for acquiring a request IU from the host 2 (block 1501). The TLP builder 54 issues the TLP to the host 2 via the interface bus 20 (block 1502).

Then, upon receiving a completion TLP that is a TLP containing information on the requested request IU, the TLP handler 52 determines whether the TLP is an IU or data. If the received TLP is an IU (request command IU), the TLP handler 52 transfers the TLP to the IU handler 51 (block 1503). The IU handler 51 checks the header of the IU (IU type and IP length) and determines whether the IU acquired from the host 2 is a spanning IU across multiple elements or an IU contained within a single elements. On the other hand, if the received TLP is data, the TLP handler 52 stores the data in the write buffer 56. The IU handler 51 checks and then transfers a command IU to the T-controller 50. The IU handler 51 also transfers the table ID of the primary table, which is the SGL control table 81, and a read command (510) contained in the command IU to the host request processing section (HR processing section) (block 1504).

A specific operation from execution to completion of a read command process will be described below which operation is performed by the controller 10 according to the present embodiment. The internal operation of the T-controller 50 will also be described with reference to a flowchart in FIG. 16.

The controller 10 carries out a read command process to transfer data read from the storage medium 11 to the host 2.

Upon receiving a read command from the IU handler 51, the HR processing section 55 starts the read command process (block 1505). Specifically, when the data read from the storage medium 11 is stored in the read buffer 57 and is ready for transfer, the HR processing section 55 requests needed SGL information to the T-controller 50 about SGL processing. As described above, the HR processing section 55 receives the table ID of the primary table, which is the SGL control table 81, from the IU handler 51. To reference SGLs, the HR processing section 55 passes the table ID of the SGL control table 81 to the T-controller 50.

As shown in FIG. 16, the T-controller 50 receives the command IU (containing the read command) from the IU handler 51 and then stores the entire received IU in the SGL standard table 82 (block 1600). As shown in FIG. 11, the T-controller 50 records the IU in elements (elements A1 to A4) in the SGL standard table 82, while simultaneously generating, for example, four SGL control tables 81 (block 1601).

As described above, the SGL control table 81 and the SGL standard table 82 are configured such that tables TBL1 to TBL5 are associated with the respective elements recorded in the SGL standard table 82 (see FIG. 10). Furthermore, as shown in FIG. 11, a table number (TBL2 to TBL4) corresponding to the succeeding elements is stored in the next table number in each of the three tables TBL1 to TBL3.

Based on the table ID passed by the HR processing section 55, the T-controller 50 identifies one of the tables (TB1 to TB5) in the SGL control table 81 and thus the SGL position in the SGL standard table 82. That is, the T-controller 50 references the SGL control table 81 based on the table ID and identifies the SGL position based on an SGL address offset in the table 81 (YES in block 1602, and block 1603).

Then, as shown in FIG. 7, the T-controller 50 acquires an address in the memory space 200 and a data transfer length based on the identified SGL, and transfers the address and the data transfer length to the TLP builder 54 (block 1604).

Referring back to FIG. 15, the T-controller 50 requests the TLP builder 54 to issue a memory write TLP (that is, a write request) for writing read data to the memory space 200 in the host 2 (block 1506). In response to the request from the T-controller 50, the TLP builder 54 issues a memory write TLP to the host 2 via the interface bus (block 1507). That is, the TLP builder 54 adds a transfer address (specified by the SGL) to data transferred from the read buffer 57 by the HR processing section 55 to generate a memory write TLP, and transmits the memory write TLP to the host 2. Thus, in the memory space 200 in the host 200, the read data is written to the address specified by the SGL contained in the command IU.

Referring back to FIG. 16, the T-controller 50, in transferring the read data (the data read from the storage medium 11), updates the standard SGL table offset on the SGL control table 81 (block 1605). The table offset is information indicative of an SGL processing status. That is, the table offset is indicative of whether or not, in the SGL control table 81, the data transfer indicated by the SGL on the secondary table has been completed.

When the data transfer indicated by the SGL has been completed, the SGL table controller 80 clears (sets a bit 0 for) the VLD in the SGL control table 81 associated with the secondary table storing the SGL (in this case, TBL2) as shown in FIG. 12. The SGL table controller 80 also delinks IU element A-2 in the SGL standard table 82 to release IU element A-2. The SGL table controller 80 updates the next table number in the primary table (in this case, TLB1) to the next table number (TLB3).

Figure 13:
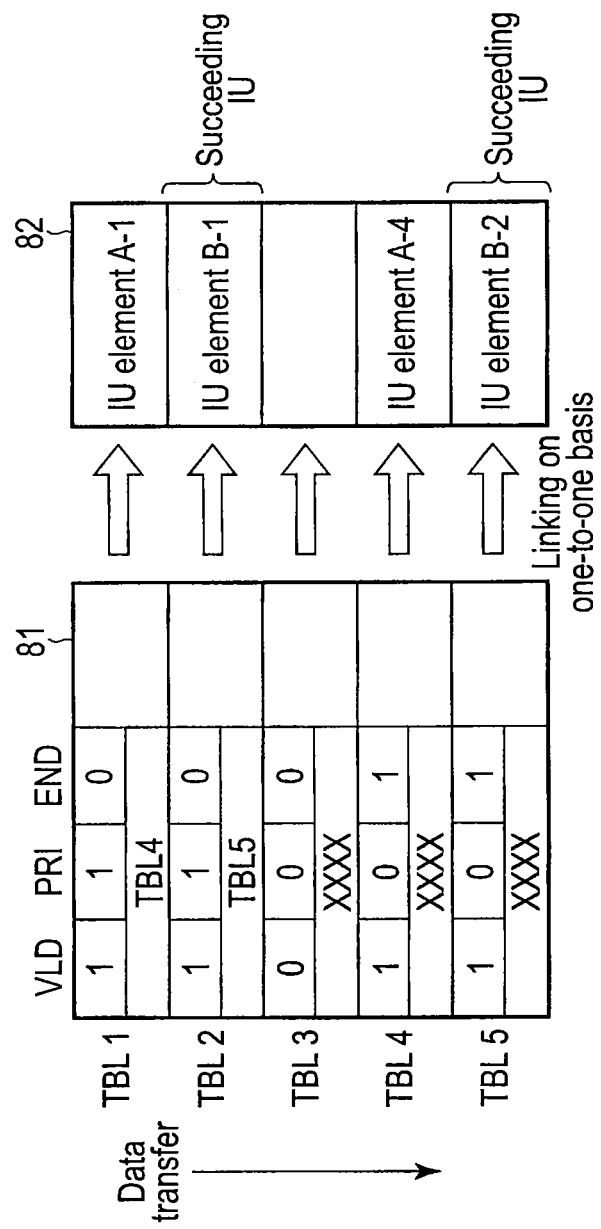
FIG. 13 is a diagram for explaining operation of the SGL table controller according to the embodiment.

Upon clearing the VLD in the SGL control table 81, the T-controller 50 searches for the free space status of the SGL standard table 82 (block 1606). Thus, the T-controller 50 can search the SGL control table 81 with the VLD cleared and thus immediately carry out a request to transfer the next IU. That is, as shown in FIG. 13, the SGL standard table 82 can store the succeeding IU (elements B-1 and B-2). At this time, the transfer of IU element A-3 in the SGL standard table 82 has been completed, and the SGL table controller 80 clears (sets a bit 0 for) the VLD in the SGL control table 81 associated with the secondary table storing the SGL (in this case, TBL3).

The primary table (TLB1), in which the header information of the command IU is stored, needs the information until a response is returned. That is, the VLD flag in primary table is preferably cleared after a process of transferring read data in response to a request command IU is completed and the result of execution of the process is stored in the queue OQ (outbound queue) in the host 2 as a response IU. When the response IU is stored in the OQ, the corresponding VLD in the primary table (TLB1) is cleared (a bit 0 is set) as shown in FIG. 14.

As described above, the present embodiment releases the table information including the SGL for which the command process has been completed. This enables minimization of the capacity of the memory storing the table information for management of IUs, allowing table management to be achieved so that the table can be efficiently used.

Specifically, after all the requested IUs are retrieved, the element containing the SGL for which the command process has been completed is released from the table for managing the IUs in units of elements. Thus, a free space can be provided in the table so as to allow the next IU to be retrieved. This eliminates the need to hold the entire IU in the table until a response is returned, allowing table management to be achieved so that the table can be efficiently used. As a result, a large-capacity table can be made unnecessary, enabling a reduction in the capacity of the memory storing the table information.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An apparatus for interface control comprising:
    an interface configured to transmit and receive information to and from a host;
    a table configured to hold management information for managing an address in a memory space in the host;
    a command processor configured to carry out a command process of accessing the memory space in the host using the management information; and
    a first controller configured to release the management information corresponding to the command process from the table in response to completion of the command process.

2. The apparatus of claim 1, further comprising:
    a second controller configured to extract request information including the management information and specifying the command process from an element that is a storage unit for queue in the host, and to store the request information in the table in units of the element.

3. The apparatus of claim 2, wherein the first controller is configured to:
    release, for a second element other than a first element including a header of the request information, second request information corresponding to the second element from the table after the data transfer indicated by the second element is completed; and
    release, for the first element, first request information corresponding to the first element after the command process is completed.

4. The apparatus of claim 3, wherein the second controller is configured to store request information corresponding to an element including next management information acquired from a queue after the first controller releases the second request information from the table.

5. The apparatus of claim 2, wherein the table comprises a first table storing the management information in units of elements and a second table storing all of the request information in units of elements, and
    the second controller is configured to manage the first table and the second table in association with each other in units of elements.

6. The apparatus of claim 2, wherein the management information includes an address for accessing the memory space in the host, and
    the command processor is configured to:
        carry out a process of writing read target data to the memory space in the host specified by address in the management information when the request information acquired by the second controller includes a read command; and
        carry out a process of reading data on the memory space in the host specified by address in the management information when the request information acquired by the second controller includes a write command.

7. A data storage apparatus comprising:
    the apparatus for interface control according to claim 1;
    a storage medium; and
    a read write controller configured to write and read data to and from the storage medium based on a command process by the command processor.

8. The data storage apparatus of claim 7, further comprising:
    a second controller configured to extract request information including the management information and specifying the command process from an element that is a storage unit for queue in the host, and to store the request information in the table in units of the element.

9. The data storage apparatus of claim 8, wherein the first controller is configured to:
    release, for a second element other than a first element including a header of the request information, second request information corresponding to the second element from the table after the data transfer indicated by the second element is completed; and
    release, for the first element, first request information corresponding to the first element after the command process is completed.

10. The data storage apparatus of claim 9, wherein the second controller is configured to store request information corresponding to an element including next management information acquired from a queue after the first controller releases the second request information from the table.

11. The data storage apparatus of claim 8, wherein the table comprises a first table storing the management information in units of elements and a second table storing all of the request information in units of elements, and
    the second controller is configured to manage the first table and the second table in association with each other in units of elements.

12. The data storage apparatus of claim 8, wherein the management information includes an address for accessing the memory space in the host, and
    the command processor is configured to:
        carry out a process of writing read target data to the memory space in the host specified by address in the management information when the request information acquired by the second controller includes a read command; and
        carry out a process of reading data on the memory space in the host specified by address in the management information when the request information acquired by the second controller includes a write command.

13. A method for interface control applied to an interface control apparatus that transmits information between a host and a data storage apparatus, the method comprising:
    storing management information acquired from the host and allowing management of an address in a memory space in the host;
    carrying out a command process of accessing the memory space in the host using the management information; and releasing the management information corresponding to the command process in response to completion of the command process.

14. The method of claim 13, further comprising:
extracting request information including the management information and specifying the command process from an element that is a storage unit for queue in the host; and
storing the request information in units of the element.

15. The method of claim 14, further comprising:
releasing, for a second element other than a first element including a header of the request information, second request information corresponding to the second element after the data transfer indicated by the second element is completed; and
releasing, for the first element, first request information corresponding to the first element after the command process is completed.

16. The method of claim 15, further comprising:
storing request information corresponding to an element including next management information acquired from a queue after the second request information is released.

17. The method of claim 14, wherein
the interface control apparatus further comprises a first table storing the management information in units of elements and a second table storing all of the request information in units of elements, and the method further comprising:
managing the first table and the second table in association with each other in units of elements.

18. The method of claim 14, wherein
the management information includes an address for accessing the memory space in the host, and
further comprising:
carrying out a process of writing read target data to the memory space in the host specified by address in the management information when the acquired request information includes a read command; and
carrying out a process of reading data on the memory space in the host specified by address in the management information when the acquired request information includes a write command.

* * * * *